FLOW SHEET FOR MAKING RADIATION SOURCES

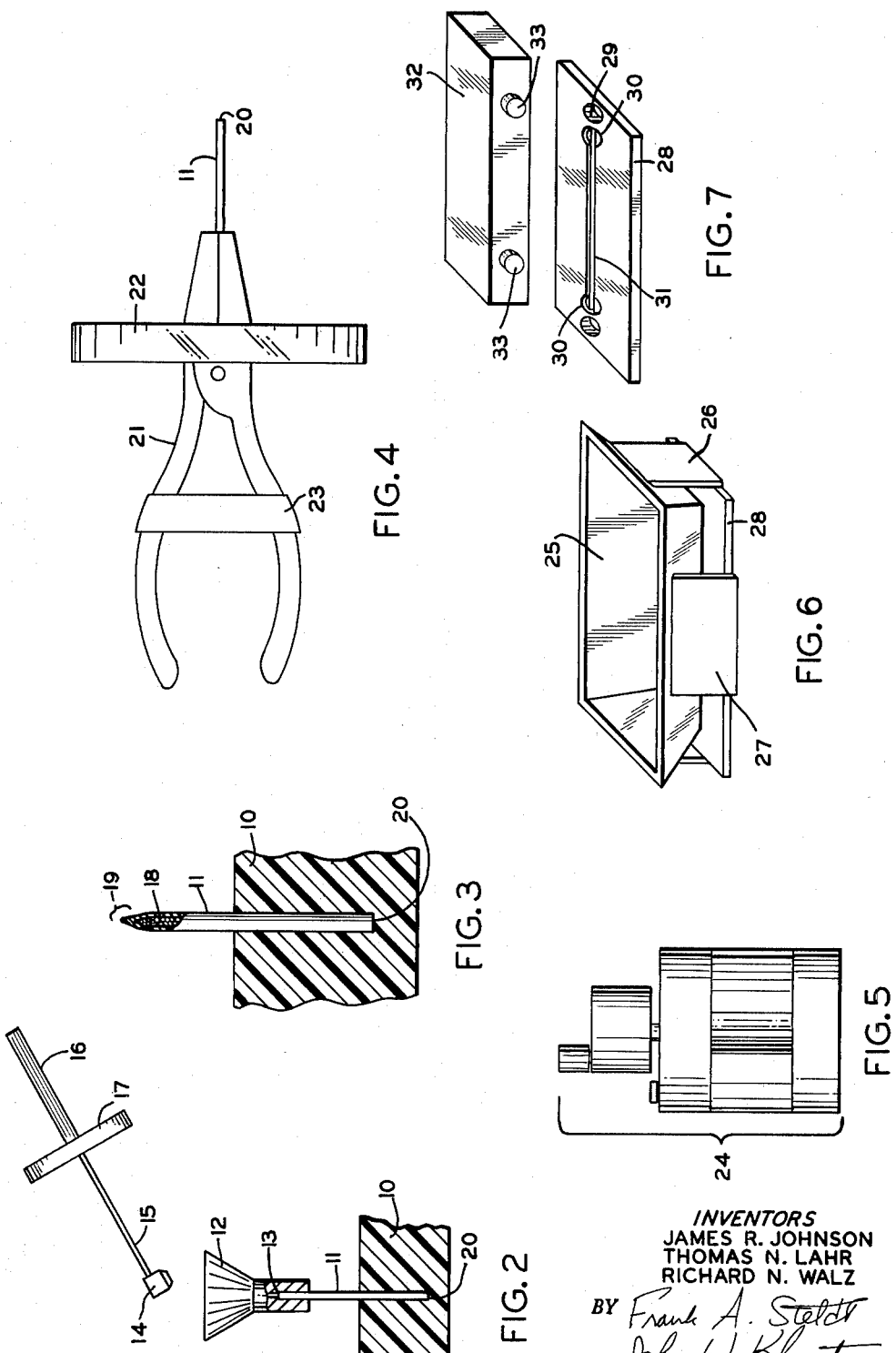

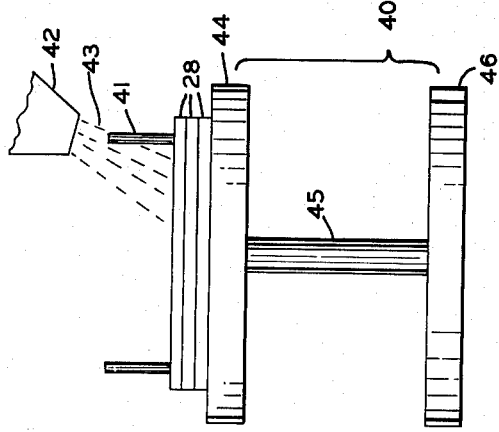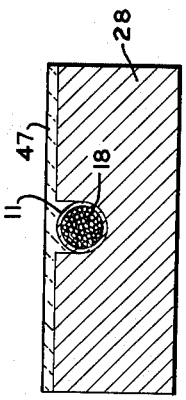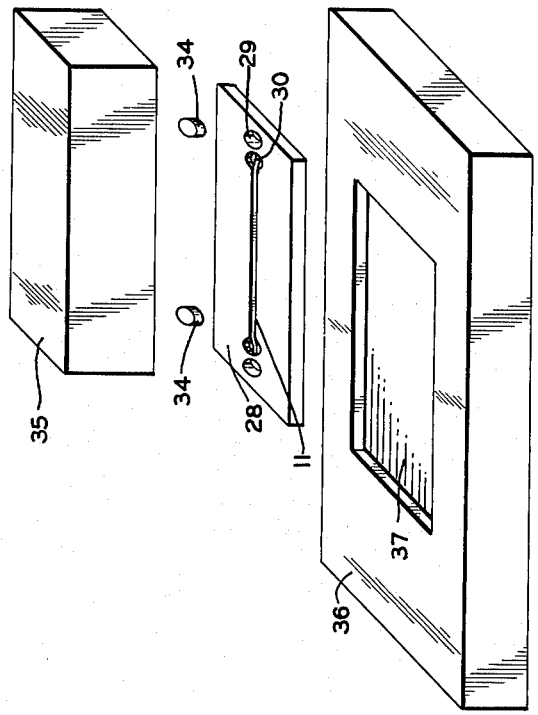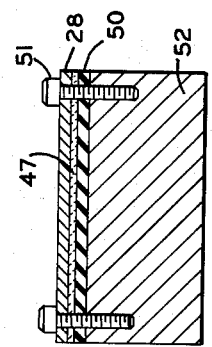

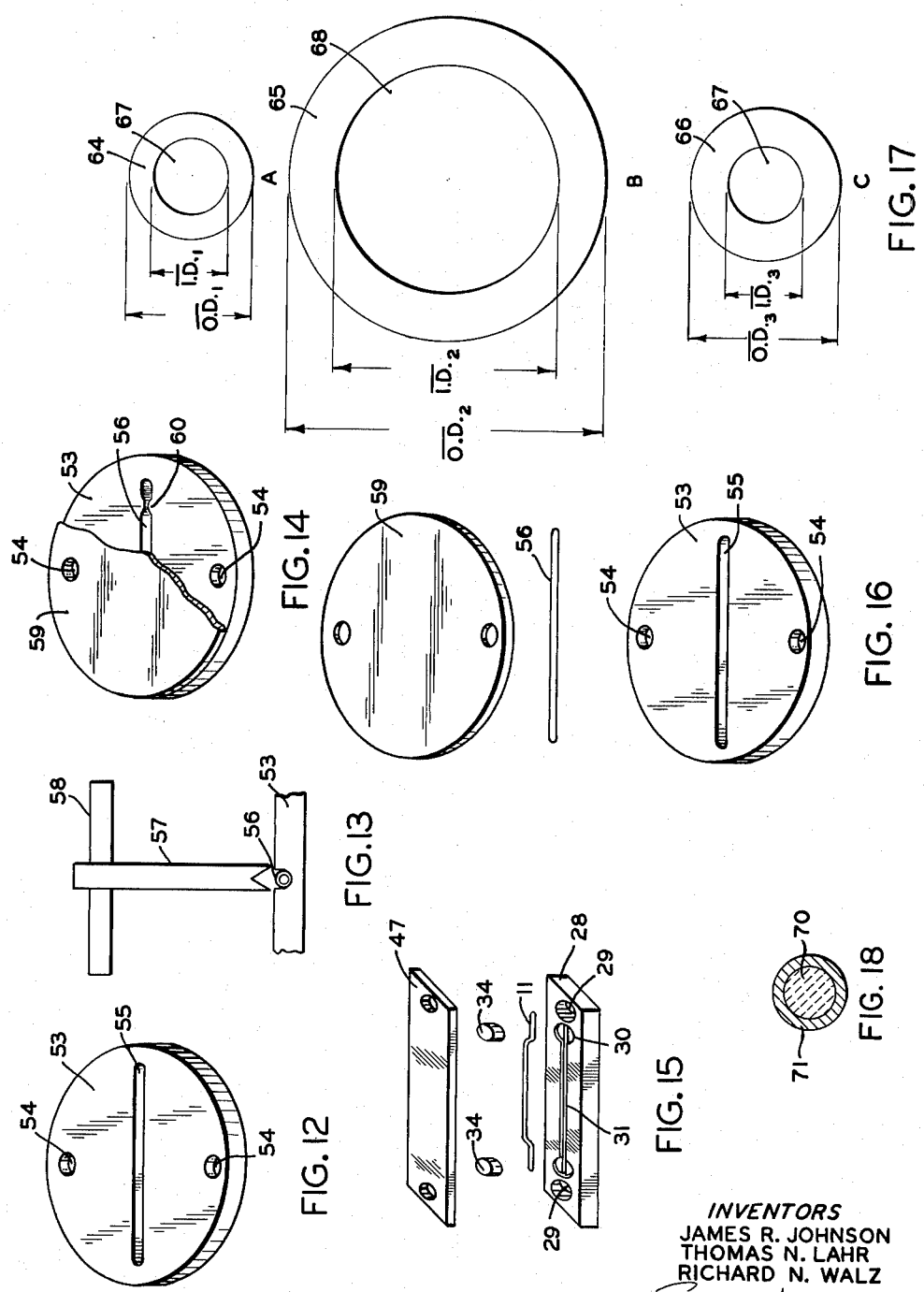

United States Patent Office 3,204,103
Patented Aug. 31, 1965

3,204,103
BETA RADIATION SOURCE IN A CERAMIC CARRIER
James R. Johnson, White Bear Lake, Thomas N. Lahr, Roseville, and Richard N. Walz, White Bear Lake, Minn., assignors to Minnesota Mining and Manufacturing Company, St. Paul, Minn., a corporation of Delaware
Filed Oct. 4, 1961, Ser. No. 142,914
10 Claims. (Cl. 250—106)

This invention relates to certain new radiation sources and methods for making the same.

More particularly, this invention relates to integral alpha, beta, gamma and bremsstrahlung radiation sources and to methods for making the same. Heretofore the art has conventionally prepared non-integral radiation sources. The basic method was simply to encase radioactive isotopes in some sort of envelope positioned about the radioactive source material. Especially for alpha and beta sources this shielding is as thin as possible in order to gain maximum usable radiation from the source.

A chief difficulty heretofore experienced in the art of manufacturing radiation sources has been that of containment of the radioactive sources material with a minimum of absorption of emitted radiation. The problem is mainly one of so constructing the encasement means that the radioactive material cannot readily be freed, yet at the same time such encasement means must permit, ideally, unrestricted emission of the specific type of radiation desired from the radioactive source material. Common to all known prior art encasement techniques is the fact that the radioactive materials can too easily be freed to the surrounding environment (unless unduly encased to such an extent that a usable amount radiation is not emitted), thereby endangering personnel using said sources.

In accordance with the teachings of this invention, there have now been found new and very useful methods for making safe industrial sources of beta, gamma, bremsstrahlung, and even alpha radiation. The invention also permits the fabrication of sources having specific geometries heretofore achieved only with great difficulty if at all. These sources are capable of emitting radiation fields of a specific type (i.e., beta, gamma, bremsstrahlung) of high purity and uniformity. Furthermore, by the present invention, it is possible to produce radioactive sources which are extremely compact without sacrificing any of the other desirable qualities associated with the products and processes of this invention. The radioisotopes utilized in this invention are at least triply encased and the resulting sources are characterized by durability and safety characteristics heretofore unattainable in prior art sources and methods of construction.

The invention is further illustrated by reference to the attached drawings.

FIGURE 2 illustrates a procedure employed in filling metal tubes with the radioactive ceramic carrier material used in this invention.

FIGURE 3 illustrates a filled tube having its filling end crimped closed, the diagram showing the top portion of the tube exterior cut away to show the tube interior.

FIGURE 4 illustrates a specially adapted pair of pilers suitable for handling and transporting filled and sealed tubes.

FIGURE 5 illustrates a device for holding and storing filled tubes which is especially useful for holding filled tubes while their respective radiation levels are being checked.

FIGURE 6 illustrates a procedure for positioning a filled and sealed tube in a source base.

FIGURE 7 illustrates a method and means for fitting a tube into a source base.

FIGURE 8 illustrates in an assembly drawing a method and means for fixing end plugs into a source base over a tube fitted into said base.

FIGURE 9 illustrates an apparatus for holding a source base during a face sandblasting operation.

FIGURE 10 illustrates an apparatus for holding a source base during an edge sandblasting operation.

FIGURE 11 shows a diagrammatic cross-sectional view of a completed radiation source of this invention.

FIGURE 12 illustrates in an isometric view a source base.

FIGURE 13 illustrates a procedure for staking closed the mouth of a groove containing a filled tube in a source base.

FIGURE 14 illustrates a partial cut-away view of a completed radiation source of this invention.

FIGURE 15 shows an exploded diagrammatic view of a completed high integrity high temperature-resistant source produced in accordance with the teachings of this invention.

FIGURE 16 shows an exploded diagrammatic view of a completed low bremsstrahlung, beta radiation source of this invention.

FIGURE 17 shows diagrammatically cross-sectional views of, respectively, a beta source tube, a gamma source tube, and a bremsstrahlung source tube, each being suitable for use in the radiation sources produced in accordance with the present invention.

FIGURE 18 shows in cross section through its center an individual spherical ceramic particle having a metallic barrier surrounding it.

Figure 1:
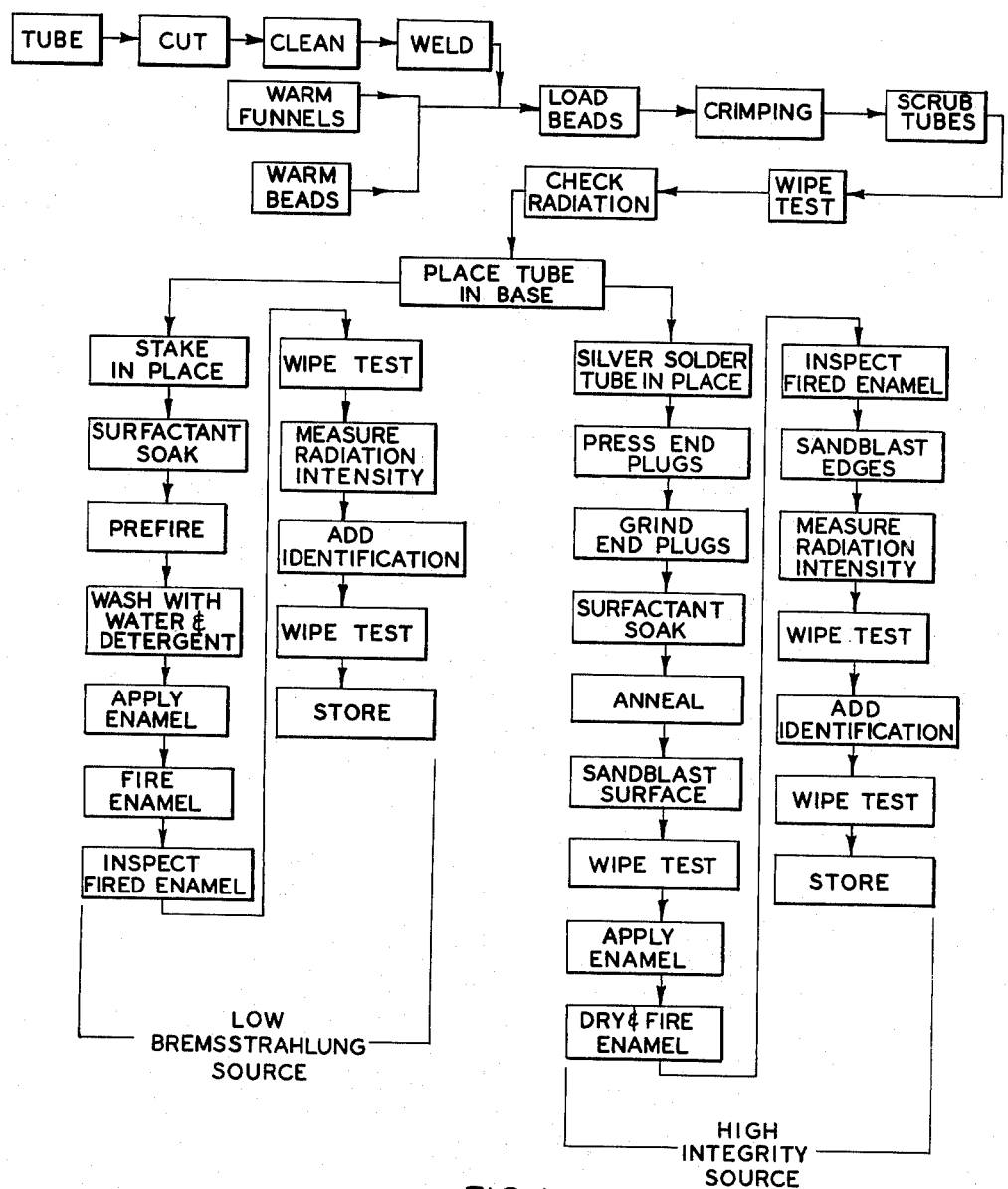
FIGURE 1 shows a flow sheet illustrating steps in the manufacture of two different types of radiation sources of this invention, one type being a so-called high-integrity, high temperature-resistant beta radiation source, and the other type a low bremsstrahlung, beta-emitting source.

In preparing the triply encased sources of this invention one employs the usual precautions required when dealing with radioactive materials.

The radiation sources of this invention usually contain four elements: (a) a base element or source base; (b) a mass of discrete radioactive creamic particles resting upon or fastened to said source base; (c) a barrier layer enclosing the said ceramic particulate radioactive mass; and (d) a continuous protective layer of ceramic material covering at least a portion of the said source base and occluding the barrier layer enclosing said ceramic particulate radioactive mass. The barrier layer and the protective layer together have a total thickness such that usable amounts of the radiation from the radioactive particulate mass of ceramic material pass therethrough.

The radioactive sources of the present invention provide an unexpected hazard reduction and safety improvement in such devices. Not only does the barrier layer provide an additional encasement serving to contain the radioactive material within a specified locale, but also it further protects the radioactive material from adverse environmental conditions which could cause release of radioactive material to contaminate the surrounding regions.

The new sources of the invention can even withstand the adverse, oxidizing, high temperature conditions characteristic of industrial fires.

The barrier layer also prevents the ceramic overcoating from reacting with the ceramic particulate material containing the radioactive isotopes. Thus, were the barrier layer not present, the ceramic top coating would tend to react with, or dissolve the particulate underlayer containing the radioactive isotope materials, thereby affording the radioactive isotopes an unwanted outlet to the atmosphere. In order to produce the desired smooth continuous overcoating, it is necessary to heat the entire source at a temperature sufficient to cause the applied overlay to fuse together and adhere to the barrier layer. During the heating process the temperatures reached, even though transitory, are generally sufficient to produce at least some interaction between the ceramic top coating and particulate material within the radioactive isotopes are confined, were this not prevented by the barrier.

By the terms "ceramic" or "ceramic materials" reference is had generally to refractory inorganic materials capable of being bonded, sintered, joined or fused to an extent such that there can be produced a solid, uniform monolithic structure (i.e., film, block, shaped article or the like). Suitable inorganic ceramic materials include porcelain enamels, glasses, inorganic cements, refractory oxides, silicates (including clays), cermets, vitreous materials and the like.

The barrier layer also gives the final product superior leach resistance. This is an unusual feature of this invention, because it unexpectedly enables one to protect the ceramic particles used as the radioactive source material by preventing the external environment, in which the radioactive sources are to be used, from deleteriously affecting the radioactive material. So far as is known, the concept of using this barrier layer as a diffusion or reaction barrier in accordance with the teachings of this invention has heretofore not been disclosed in the literature or patents.

The products of this invention display extraordinary resistance to adverse environmental conditions. The products display extreme high temperature-resistance and extreme resistance to strongly acid or alkaline conditions. In fact, the products of this invention have remarkable stability, for example, sources intended for medical use are safely sterilizable by autoclaving, dry heat, etc.

Suitable tests for determining the ability of radiation sources to withstand severe environmental conditions are as follows. Note that the word "withstand" as used herein means release of less than 0.05 microcurie of radioactivity after testing.

(1) *Positive containment.*—Positive seals between the radioisotope and the environment (generally at least three in number).

(2) *Impact.*—Withstand 10 impacts on the surface nearest the radioactive material of 2-foot pounds each from an impact hammer with a ½-inch hemispherical head.

3) *Abrasion.*—Withstand 1000 two-inch strokes on surface closest to radioactive material over 100-grit sandpaper in 2 minutes with a 5-pound load.

(4) *Soaking.*—Withstand 100-hour soaks at 50° C. in 100 ml. each of tap water, a dilute acid (i.e. 0.1 N HCl), a dilute base (i.e. 0.1 N NaOH), surfactant solutions, salt solution, and common organic solvents such as acetone or alcohol.

(5) *Vibration.*—Withstand 4 hours vibration at 280 cycles per minute with 1½ inch amplitude while in a container that is ½-inch larger than the source in each dimension.

(6) *Acceleration.*—Withstand accelerations or decelerations equivalent to 10 times gravity.

In general, there are two classes of integral sources within the scope of the invention, namely, high temperature-resistant sources and low temperature-resistant sources. High temperature-resistant sources further are suitably tested by the following tests:

(A) *High temperature.*—Withstand being heated in a furnace to 1000° C., held at temperature for 30 minutes and allowed to cool with the furnace.

(B) *Thermal shock.*—Withstand being heated in a furnace to 800° C., being removed and immediately plunged into running water at 10° C.

(C) *Hot metal dip.*—Withstand being immersed in molten aluminum at 700° C. for 30 minutes.

(D) *Impact.*—Withstand being subjected to 25 impacts of 2-foot pounds each from an impact hammer with a ½-inch hemispherical head.

(E) *Mechanical deflection.*—Withstand being bent into an arc of a 3-inch diameter circle.

(F) *Acceleration.*—Withstand acceleration or deceleration equivalent to more than 20 times gravity.

As is more fully explained hereinbelow, the base element or source base is usually metallic, as is the enclosing barrier layer. The ceramic materials used both in the top coat or layer and in the particles are conventional, though preferred materials are those which will bond to metal when heated.

In general, as the mass of discrete radioactive ceramic particles, one can use any finely-divided ceramic material which contains a radioactive isotope. The particle size of the individual ceramic particles is generally under 500 microns and preferably is less than about 300 microns, on the average. Any conventional method of preparation can be used, such as those described in such references as Nucleonics 11, No. 3: 49 (1953)—W. S. Ginell and G. P. Simon; Science 112: 400 (1950)—W. Kisieleski, G. Sbihla and A. M. Brues; Nucleonics 14, No. 8: 82 (1956)—C. Blincoe; Nucleonics 12, No. 12: 14 (1954)—W. S. Ginell, J. J. Martin, L. P. Hatch; A.E.R.E. Harwell Publication CE/R 1658 (1955)—Bene, Grover, Hutcheon; Nucleonics 13, No. 12, 27–29 (1955)— Hatch and Regan; A.E.R.E. Harwell Publication C/R 1686 (1955)—Amphlett and Warren; U.S. 2,556,616; U.S. 2,500,801; German patent application A21548, Class VIIIc/21g, 21/10; U.S. 1,718,899; U.S. 2,326,631; U.S. 2,462,241; U.S. 2,479,882; U.S. 2,554,476; U.S. 907,066; U.S. 1,032,779; and U.S. 1,285,704.

One method of making radioactive ceramic particles for use in this method is described by L. P. Hatch in U.S. Patent No. 2,918,700. Herein is described a method for preparing fired clay particles containing fixed radioactive cations. These fired clays are useful as sources of gamma or beta radiation. Conventional pulverizing techniques can be used to reduce the particle size of these clays to the diameters useful for making the products of this invention.

A preferred radioactive particulate ceramic starting material is the radiating microspheres produced in accordance with the teachings of Ryan in U.S. patent application Serial No. 712,254, filed January 30, 1958, now Patent No. 3,147,225. These microspheres contain the desired radioactive isotopes. The radiating microspheres useful in this invention have averaged diameters ranging from about 10 to 200 microns. A preferred average diameter range is from about 40 to 80 microns. These spherical bodies are very uniform, not only as respects average sphere size in a given mass of spheres comprising any given batch, but also the individual spheres themselves are characterized by having only slight variations in sphericity. Thus, the diameter of any given sphere is the same regardless of the direction through the center of the sphere in which the measurement is taken. The radioactive isotopes which can be contained in these spheres or particulate ceramic material and which are useful as sources of beta radiation can be almost any isotope emitting a beta particle, for example, Promethium-147, Thallium-204, Calcium-45, Yttrium-90, Strontium-90. A preferred beta-emitting isotope is Strontium-90. In general, the radiating microspheres will generally contain a beta emitter with a maximum energy greater than 100,000 electron volts (100 kev.).

In general, there are two different methods for establishment of the barrier layer in the source of this invention. In the first method a mass of radioactive particles is enclosed within a walled structure such as a tube. In the second the individual radioactive particles are separately coated with a barrier layer.

First will be described the method where the barrier layer is placed around a collection of particles. For example, for purposes of illustration, the manufacture of one type of beta radiation source which can be produced in accordance with the teachings of this invention will be described. Such beta source employs small tubes as the barrier layer. These tubes, usually metallic, can be of various lengths, depending upon the physical shape and character of the beta-emitting source being produced. The inside diameter of these tubes should range from about 0.005 to 0.50 inch and the outside diameter of these tubes should range from about 0.006 to 0.60 inch. A preferred inside diameter range is from 0.015 to 0.025 inch and a preferred outside diameter range is from 0.019 to 0.033 inch. Typical metals which may be used in these tubes comprises any common metal or alloy such as stainless steel, aluminum, copper, brass, iron, beryllium, Monel, steel, and the like. Preferred metals here are aluminum and stainless steel. Among the non-metals useful as barrier tubes in these sources are graphite and ceramic materials.

The selection of the proper combination of isotope and tubing material depends on the intended use of the beta-emitting source. The data needed to make this choice are known to the art. The conditions of intended use and the radiation absorption of the metals are important criteria. For example, if a soft beta-emitting source is desired, one can choose Promethium-147 ($E_{max}$=0.223 mev.) and thin-walled magnesium tubing.

If the application calls for a beta particle in the intermediate energy range, one can choose Thallium-204 $E_{max}$=0.765 mev.) and aluminum tubing with a wall thickness in the 4–7 mil range. If the application requires a very penetrating beta particle with low bremsstrahlung production, one can choose Strontium-Yttrium-90 ($E_{max}$=2.18 mev.) and aluminum, or if the application demands an extremely high temperature, chemical and shock-resisting source, one can choose Strontium-90 and stainless steel tubing.

Referring now to the drawings, FIG. 1 shows a flow sheet suitable for making radiation sources in accordance with this invention. It will be appreciated that in this chart initially one starts out with a tube and the radiating microspheres. The tubes, as shown in FIG. 1, are cut and cleaned to remove any extraneous matter. In filling a particular tube one begins with a straight tube. First one end of the tube is hermetically sealed shut as by heliarc welding. Conveniently, a funnel is used for filling, and the tube and funnel assembly and the ceramic microspheres themselves are maintained at a temperature preferably above 60° C. This should be done in a dry containment box in which the humidity is maintained such that radioactive microspheres do not stick to surfaces which they contact.

The tube is then filled with warmed microspheres, crimped, hermetically sealed, scrubbed, wipe-tested, and finally checked for appropriate radiation level. Thereafter the tubes, depending upon the type of source being made, are mounted in a source base.

Describing now in greater detail the processes of the invention with references to the flow sheet as presented in FIG. 1, the invention is described by reference to the FIGS. 2 through 22. As was mentioned, the cut, cleaned tube 11 is sealed by welding at one end 20. This welded tube is then fixed into a tube-holding block 10 and fitted with an especially designed funnel 12. This funnel 12 is fitted with an inside shoulder 13 in its neck, said shoulder being so designed that the funnel when fitted over the top of a tube 11 comes to rest on the shoulder 13. It is desirable that there by very little air space between the outside of the tube and the inside wall of the funnel neck. Suitably, one can mount any number of tubes with respective funnels in a single base block 10, although four only are shown in FIG. 2. This base block 10, for reasons of convenience in filling the tubes, may be conveniently mounted upon a vibrator, but the use of an agitator is optional in many instances.

Now, as a preliminary step, the radioactive particulate ceramic material, here shown in the form of beads, is first preheated by any conventional means (not shown). Then, from a dish holding the heated beads, one extracts sufficient quantity to fill a tube 11. Note that it is desirable to have the funnel 12 and the tube 11 also preheated or warmed, the purpose, as disclosed more fully hereinafter, being to eliminate any possible water vapor, which is customarily present upon objects at room temperature. The heated beads are transferred from their warming vessel (not shown) to the funnel by means of a scoop 14. It is preferred that this scoop have a capacity which is sufficient to fill one tube. This scoop 14 is customarily mounted upon a scoop supporting arm 15 which, in turn, is attached to a scoop assembly handle 16. In order to afford radiation protection the scooping assembly handle 16 has before it a radiation shield 17. As those skilled in the art will appreciate, the thickness of this shield 17 and similarly its composition will depend upon the type of radiation being emitted from the radiating microspheres to be handled by the scoop 14.

The funnel 12 receives the beads discharged from a scoop 14. Because of the uniform character of the radiating microspheres, such a calibrated scoop accurately measures a designated or desired volume of beads (i.e., radiating microspheres). The particular volume of beads used in any given instance, of course, will be that which is determined as necessary for obtaining the desired radiation characteristics and will, in all cases, be less than or equal to the void volume of the tube.

The beads tumble down into the neck of the funnel and, in turn, into the tube itself. To aid in moving the beads down the hopper or funnel into the tube and then down the tube to the fill level, it has been found desirable to vibrate the assembly of funnel plus tube. Such vibration not only tends to pack the beads uniformly in the tube but also aids the movement of the beads since there is a certain frictional resistance to the movement of the beads along interior funnel and tube walls.

The beads, when finally packed into the tube, are uniformly distributed throughout the interior length of the tube. By the term "uniformly" is means that the interstices between beads are not sufficient in volume to accommodate additional beads. Such a uniform fill of the tubes results from the uniform packing produced by vibrational effects and the resulting even distribution of radiating microspheres over the length of a given tube is thus constant and tends to produce a uniform output of beta radiation.

After a tube has been filled, the funnel is removed and the open end of the tube is crimped closed by means of a conventional crimping implement (not shown).

The so-filled and crimped tube is then picked up by a pair of pliers 21 (FIG. 4) which has its jaws especially adapted to receive a tube 11. It has been found best that these jaws have an opening slightly smaller than the outside diameter of the tube when the jaws are compressed. This facilitates holding the tube 11 during the next step which is the washing operation. Provision for urging the jaws of the pliers together, such as elastomeric band 23 or spring means around the handles of the pliers urging them together, facilitates the holding operation. Again, as in previous cases, the radiation shield 22 is provided to protect the operator's hands from the radiation emitting from the filled tube 11.

Optionally, the so-sealed tube can now be bent into any desired shape, e.g., a circular or elliptical shape, so as to produce a particular type of radiation source as desired. The entire fill operation including sealing and any bending can be done in a conventional glove containment box with ½" Plexiglas type widows; such a box is sufficient for the containment of the beta radiation involved here. After this operation the filled tubes can optionally be removed from the glove containment box and transported in a plastic or aluminum shielded holder to a location where the next steps in the processes of the invention are carried out. One uses a plastic or aluminum shield holder because of the low bremsstrahlung production associated therewith.

The so-filled tubes are now washed with water and a surfactant to remove any particulate matter which may be clinging to the exterior surface of the filled tubes, so as to leave the exterior of the tubes substantially free from any alien particles.

After a washing operation, the loaded tubes can be positioned in a holder 24. After removal from this holder the tube is placed in a source base in the desired geometrical configuration (i.e., a straight line, circle, triangle, or any other desired geometrical configuration). A means of locating the tube in the source base 28 is shown in FIG. 6. A tube locating hopper 25 is positioned over a source base 28. The tube hopper 25 is fitted to the source base 28 by means of locating legs 26 and 27. These legs are mounted or fixed to the sloping outside walls of hopper 25, being so located as to permit the hopper locating legs 26 and 27 to slip over the edges of the source base 28. When the hopper is so positioned over the source base one simply drops or slips a filled tube into the hopper. The hopper then causes the tube to slip into the previously prepared slot in the source base.

The source base is a body made to conform roughly to the shape of the particular tubes involved. Thus, if the tubes have not been bent, a square or rectangular block may be used. If the tubes have been bent into a circular or elliptical pattern usually the base will be made to correspond roughly to the configuration of the tube or tubes. This source base or ceramic is usually of metallic composition, although graphite or ceramic source bases can be used. The particular metal or non-metal used can be of any particular variety depending on the end use of the source base, but usually one will use an aluminum or stainless steel source base, either to reduce bremsstrahlung generation (aluminum) or to gain high temperature-resistance (stainless steel). Usually radiation in one direction only is contemplated, but source bases which radiate in two or more directions are entirely within the contemplation of this invention.

As indicated, the grooves in a source base have a depth at least equal to or greater than the diameter of the tubes involved. In width the groove is in its base region at least equal to the diameter of the tubes. Thus, when the tubes are laid in the recesses provided for them in any given base block, the tube will not project above the surface of the block. Such an arrangement provides abrasion and impact resistance to the tubes without deleteriously affecting the product of a uniform field of beta-radiation in the region adjacent the block face.

Instead of recessing the tube into the base block, it can be mounted on the surface of the base block. This produces a uniform field of radiation for an entire area of 180° above the source block at a constant distance therefrom the tube.

Next, the tube hopper is removed and the loaded tube 11 is firmly positioned in its groove 31 by means of a forming block 32 which is fitted with pins 33. These pins are so positioned on forming block 32 that they depress the ends of the filled tube 11 into wells provided in the base block 28, said wells include a recess for the reception of end plugs 34 over the ends of the filled tube 11.

The choice of base material is dictated by the following criteria, whose relative importance is essentially determined by the final application of the radiation source. These criteria are: high temperature-resistance, machineability, environmental resistance, cost, radiation stability, availability, and the like.

For high temperature-resistance, plus mechanical strength, one uses stainless steel or Monel. For high temperature, strength, and low bremsstrahlung, one uses graphite or pressed or sintered $Al_2O_3$. For ease of fabrication, plus low bremsstrahlung, one uses aluminum. For low temperature, low bremsstrahlung, low density and low intensity, one uses plastics such as polyethylene or polystyrene.

The high temperature-resistant integrity source which has been described above is a stainless steel embodiment. Stainless steel embodiment means here that all of the components are stainless steel except the ceramic radioactive particles in the tube, the silver brazing alloy used to secure the tube to the base and the ceramic overlay.

After the tubes are located in the source base, they are silver-brazed to the bottom of the recesses in the base block.

Silver braze, as is well known, has a higher melting point than other types of solders, such as the lead-tin solders. Silver brazes, therefore, are more desirable for purposes of this invention since they give a better seal between the source tube and the base block at higher temperatures. Furthermore, silver brazes tend to adhere to a variety of metal surfaces with greater adherence than is associated with the more conventional types of solder, such as the lead-tin varieties.

When silver-brazing is employed, it is preferred to make the recessed portions, especially in the case of straight tubes, deeper in the end regions wherein the tube ends lie than in the main or central regions of the tube. Such deeper recessed areas at the tube ends in the base block provide a well for the reception of the silver braze.

The silver braze serves to tack or secure the tube to the base block and at the same time provide a hermetic seal for the occluded ends of the tube or tubes in the base block.

After the silver-brazing step, one removes the flux, as by washing, and inserts plugs over the recessed tubes in the base block at one or more points. In the case of straight tubes one plug is preferably fitted across each end of a tube. These plugs can either be separate metallic bodies which press-fit across the mouth of the recessed cavity or cavities in the base block, or they can be lip-like projections (as in the case of aluminum) extending from one edge of the recessed areas in the base block. In the latter case, the parallel lips will bend into a position relative to the base block surface. Then when the tubes are in place, these lip-like plug projections are simply bent over. The purpose of these plugs or lip-like projections is simply to provide a positive means for securing the tubes in the base block during subsequent handling.

It will be appreciated that other means can be used to attach the radiation source tube to the base. Some of these means are bonding with organic or inorganic adhesives, using magnetic properties, other types of mechanical securing methods, and the like.

The attachment of the stainless steel end plugs 34 into recesses provided in the source base 28 is shown in the flow sheet (FIG. 1). This is accomplished in a manner as shown in FIG. 8 where the source base 28 is located in a recess 37 in a holding block 36. The end plugs are manually positioned approximately in the recesses 30 provided and are then permanently located in position by means of a driving block 35, which is forcefully contacted with the end plugs 34 pressing them into their recesses.

The driving block 35 is then removed, the source base 28 is removed from the recess 37, the end plugs are ground flush with the face of the source base, and the assembly is then annealed to remove any residual stress induced by the operation of pressing the end plugs into position.

The physical dimension of these plugs are usually very small. In the case of the press fit plugs the plug is just large enough in width to fit across a tube recess in the base block and wide enough to give the plug the necessary rigidity and strength. In the case of the lip-like plugs which are a part of the base block surface, it will be appreciated that these plugs can even be smaller in size and, in fact, need not even project completely across the top opening comprising the mouth of the recess in the base block.

It will, of course, be appreciated that the minimum diameter of the plugs will be larger than the outside diameter of the tubes. This, of course, is necessary in order for the plugs to perform their function of securing the ends of the tube in its position.

The next operation, as described in the flow sheet of FIG. 1, is sandblasting of the face of the source base 28 to prepare it for the application of a ceramic (say porcelain enamel) overlay 47. One method of doing this sandblasting operation is shown in FIG. 9. The source base 28, to be sandblasted, is located on a face sandblasting holder 40 by means of two positioning pins 41, said pins engaging mounting holes 29 temporarily holds the source base 28 to the rotating table 44 of the face sandblasting holder 40. The face of the source is then sandblasted by means of a sandblasting nozzle 42 and a sandblast grit 43 which is propelled against the face of the source by means of air pressure.

The face sandblasting holder 40 is made up of a rotating member 44, a supporting shaft 45, upon which the rotating member turns and a fixed base 46 which is affixed to the supporting shaft 45. Sand blasting should generally be carried out only long enough to clean and slightly roughen the surfaces.

After the source face has been sandblasted, it is wipe-tested to insure that there is no extraneous radiocative material present on the external face of the source. After the source is dried, a coat of ceramic material such as porcelain enamel is applied to the source base by brushing, spraying, or dipping, with spraying being preferred method. One applies sufficient porcelain enamel slip (containing frit) to the surface to produce the desired thickness of enamel across the surface of the base block after firing.

Various enamel frits can be used, but one must be careful to match the frit to the source body and at the same time keep the percentage of high atomic number material to a minimum so as to minimize the generation of unwanted bremsstrahlung.

In general, one selects a top ceramic coating which has a composition such that at least 95 percent (and preferably 99 percent) of the elements contained therein have an atomic number less than 23. For example, a typical frit composition contains from 50-70 percent $SiO_2$, 10-40 percent $TiO_2$, 0-10 percent $Na_2O$, 0-10 percent $K_2O$, 0-10 percent $CaO$, 0-5 percent $CoO$.

The ceramic top coating need have no other particular characteristics. It will be appreciated, of course, that any particular ceramic coating employed in a specific embodiment of the invention should be one which has approximately the same thermal coefficient of expansion as the base block and has reasonable physical integrity or mechanical strength such that it will resist the particular environmental conditions two which it is anticipated that the source will be subjected. The thickness of a ceramic coating such as an enamel frit will usually be in the 0.001 to 0.015 inch range. One preferred range for maximum performance and minimum absorption of beta radiation is in the 0.001 to 0.006 inch range. It is preferable to select a thickness of enamel layer such that a minimum of the radiation is absorbed in said layer. For a Promethium-147 source, for example, this thickness can be .0012 inch or less, but for a Strontium-Yttrium-90 source it can be as high as .035 inch.

After application, the slip of the porcelain enamel frit is then air-dried and fired to a smooth, continuous film. In general, one fires the frit at a temperature which is sufficient to effect melting of the frit and produce a glassy, continuous, inorganic, non-porous, enamel layer uniformly across the surface of the base block over the region of the radioactivity. After the source base is cooled, the procelain enamel overcoat is inspected for any cracks, misses, spots, or other faults. If a fault is found in the porcelain enamel overcoating, the complete surface of the source is re-sandblasted by means of the apparatus as shown in FIG 9, recoated with the porcelain enamel and fired again.

At this point the hermetic seal of the source is checked by immersing the source for a period of time into a hot oil bath; said bath causes the expansion of the air in the filled tube 11 and forces the expanded air out through any remaining openings. Any air which is then expelled appears in the bath in the form of bubbles. Any source which produces bubbles in this bath is rejected. Characteristically, an oil of high boiling point, such as silicone oil, is used as the bath medium.

A source which has passed this hot oil leak test can then be given a final treatment to improve aesthetic values by sandblasting away any extraneous porcelain enamel which may be on the edges or back of the source base 28 as a result of the ceramic enamel application. One method of removing this extraneous porcelain enamel from the edges of the source base is shown in FIG. 10. Characteristically, the source base 28 is located in inverted position, with the enamel overlay 47 in intimate contact with a pressure absorbent material 50, maintained by retaining screws 51 which also position the source base on the edge sandblast holding block 52. While the source is in the position, the extraneous porcelain enamel and any other foreign matter is removed from the edges or back of the source by sandblasting, using the sandblast nozzle 42 and the air propelled sandblast nozzle 42 and the air propelled sandblast grit 43.

After this cleaning operation, the source base is removed from the edge sandblast holding block and wipe-tested. Identification is added and the source is rewipe-tested and stored.

A cross-section of a typical source manufactured by the above-described process is shown in FIG. 11, wherein the radiating microspheres 18 are located inside the tube 11 which is positioned in its proper location on the source base 28. The porcelain enamel overlay 47 is shown to provide the final seal on the radioactive material. Thus, the radioactive material has a triply-encapsulated configuration, the first encapsulation being the radiating microspheres, the second encapsulation and barrier layer being the sealed stainless steel tube, and the third encapsulation being the porcelain enamel overlay.

As was shown in FIG. 1, a similar method of construction or manufacture can be used to give a beta-emitting source with a very low bremsstrahlung output. The purpose of providing this low bremsstrahlung source is twofold: (1) to reduce the penetrating radiation in the vicinity of the device containing the source so as to minimize the hazard to personnel operating the device; and (2) to reduce the electronic "noise" in associated electronic equipment caused by bremsstrahlung generated by the radioactive source.

A typical low bremsstrahlung source can be made by the procedure described in FIG. 1 using, for example, aluminum as the material from which the tube and the source base are made. A typical source base is shown in FIG. 12. The configuration shown is a round base with a straight line groove. It will be appreciated, of course, that other geometrical configurations can be used, such as a square base or a rectangular base with grooves of the desired geometrical configurations, as well as tubes of rectangular, square or other cross-section. The source base 53 shown in FIG. 12 consists of a disk of aluminum into which a tube groove 55 has been machined. Mounting holes 54 are also provided for the future applications of the source. After the tube has been located in the base by the method described for the high integrity source, the tube loading hopper is removed from the source base and the tube is fixed in position by the method shown in FIG. 13. A tube 56 is affixed in position by the application of the staking implement 57. A radiation shield 58 is provided around the shaft of the staking implement as will be appreciated by those skilled in the art. The size and material used in the radiation shield 58 will be subject to the same conditions as used in describing part No. 22. The reasons for using a given shield are the same as those stated for describing that piece. The staking implement permanently affixes the loaded aluminum tube in position by slightly caving in the sides of the tube groove 55. This then holds the tube in position.

After the tube has been located in place the source is prepared for the application of an aluminum porcelain enamel by pre-firing the piece and then scrubbing the surface of the radiation source with a surfactant and water.

The aluminum porcelain enamel is applied to the face of the radiation source by spraying, dipping or brushing, with spraying being the preferred method. The aluminum porcelain enamel is fired, without previous drying, at the appropriate temperature for the appropriate time. After the source has been fired, the porcelain enamel is inspected for spots, chipping or other flaws. A partial cross-section of the completed source is shown in FIG. 14 of the drawings, where the source base 53 has the filled tube 56 located in its groove. The product of the staking operation is 60, and is also shown in FIG. 14 where the sidewalls of the tube groove are partially caved in against the filled aluminum tube 56. The porcelain enamel overcoat 59 is also shown in this figure as a partial cross-section. The mounting holes 54 are provided for future application.

A comparison of exploded views of the high integrity beta-emitting source and the low bremsstrahlung beta-emitting source is given in FIGS. 15 and 16. In FIG. 15, which is the exploded view of the high integrity source, the piece shown includes the source base 28 with its mounting holes 29 and tube grooves 31 and end plug recesses 30. The final form of the filled stainless steel tube 11 is also given. The stainless steel end plugs are shown in their position above the ends of the stainless tube. The ceramic overlay 47 is shown in its position as the final encapsulation for the radioactive material.

The exploded view of the low bremsstrahlung beta-emitting source is given in FIG. 16, where the source base 53, the tube groove 55 and the mounting hole 54 are shown in the lower part of the figure. The filled aluminum tube 56 is shown in its position above the source base and the aluminum porcelain enamel 59 is shown as the final encapsulation or occlusion of the radioactive material.

In general, one would normally use three different types of tubes in preparation of sources described by the teachings of this invention. Cross-sections of these tubes are shown in FIG. 17. A tube 61 which would be used for a beta source would be one which has preferably a small inside diameter to reduce the amount of self-absorption of the beta radiation in the radioactive ceramic material itself to a minimum. The radiation tube wall 64 also should be of a minimum thickness in order to reduce the amount of radiation absorbed by it, as will be appreciated by those skilled in the art.

If one wishes to make a gamma source by the teachings of this invention, a tube 65 with a much larger inside diameter could be used, if desired, because, as those skilled in the art will appreciate, there is much less self-absorption when gamma-emitting radioisotopes are used than when beta-emitting isotopes are used. In this case, the tube wall 55 could be much thicker than would be the case with a beta-emitter for the same reason, that is, there would be less absorption in the wall with a gamma-emitter than with the said beta-emitter. The cross-section of the larger tube 62 could be completely filled then with the radiating microspheres 68.

If one wishes to make a bremsstrahlung source by the teachings of this invention, a tube such as is shown by cross-section 63 would be used wherein a small inside diameter 67 would be desirable because of the fact that beta-emitting isotopes again are used and self-absorption is most desirably kept at a minimum. The wall of the tube 66 is of such thickness that all of the beta particles which reach the inside diameter of the tube would be absorbed before they reached, or just as they reached, the outside diameter of the tube, that is, the thickness of the wall would be just that required to absorb all of the beta particles emitted by the isotope in the inner portions of the tube. The material of construction of the bremsstrahlung tube would preferably be of a high atomic number, such as lead, gold, platinum, uranium, or the like.

If one desires to produce a gamma-emitting radiation source, an appropriate gamma-emitting isotope such as Cobalt-60, Cesium-137, Radium-226, Zinc-65, or the like, is incorporated into radiating microspheres. Then radiating microspheres containing the appropriate amount of the desired gamma-emitting radiating isotope are loaded into tubes. The general method of construction of a gamma radiation source is that described for the beta-emitting radiation source. The major differences between the two processes are the use of larger amounts of shielding which is required for handling gamma-emitting isotopes, and the larger variety of tubes which can be used to hold the radiating microspheres containing gamma-emitting isotopes as compared to the sizes of the tubes used for, say, beta-emitting sources. The inside diameter of the tubes used for the gamma source preferably range from 0.005 inch to 0.250 inch.

The preferred outside diameter range is from 0.020 inch to 0.500 inch.

Since the problem of absorption of the gamma rays by the tube wall is much less acute than for beta particles, one can use any common metal or alloy such as stainless steel, aluminum, copper, brass, iron, Monel, steel, and the like, as the material of construction for the tube and the source base. One can also use ceramic materials.

Contrary to the criteria needed for making a choice of the material of construction for use in a beta-emitting source, one can choose the material of construction of a gamma-emitting source merely by consideration of the final application. In general, stainless steel is a preferred material of construction for the tube and source base because of its resistance to corrosion by most ambient conditions. One exception to the statement is in applications where the radiation source will be subjected to halides or halide ions. In such application Monel metal would be a preferred material of construction.

In general, one can prepare two types of bremsstrahlung radiation sources by the teachings of this patent. One type has the bremsstrahlung generator intimately mixed with the radiating microspheres inside of the tube. An example of this is mixing gold metal powder with the radiating microspheres and then loading the uniformly mixed material into the tube. One method of preparing this mixture is to take equal volumes of the radiating microspheres and gold powder (preferably with a mesh size not larger than about 100). It will be appreciated by those skilled in the art that if this method of construction is used, the wall of the tube will be preferably as thin as possible, to reduce the absorption of the bremsstrahlung in said wall. One normally uses metals as the material of construction. Again, preferred metals are stainless steel, Monel, and aluminum.

Another technique for manufacturing a bremesstrahlung source in accordance with the teachings of this invention is to employ beta-emitting radioisotope labeled radiating microspheres, and to use a barrier a material which is a bremsstrahlung generator. Such materials are metals of high atomic number such as gold, platinum, uranium, and the like. It will also be appreciated that the preferred wall thickness is that which will just absorb the highest energy beta particle emitted by the radioisotope. This arrangement then gives the maximum bremsstrahlung output per unit of loaded radioactivity. As an example of this second type of bremsstrahlung source, one can load a gold tube with a wall thickness of 0.008 inch with Ryan-type radioactive beads which contain a beta-emitting isotope. The wall thickness given is based on the absorption of the beta particles having an energy of 1 mev. If beta particles of other energies are emitted, the wall thickness could be adjusted accordingly.

If one wishes to use other high atomic number materials as the material of construction, the wall thickness required to absorb the beta particles can be calculated from the rule that the necessary thickness is inversely proportional to the density. Thus, one could use other materials such as lead, zirconium, osmium, iridium, tantalum, tungsten, rhenium, palladium, and the like.

The procedure used in the manufacture of gamma and bremsstrahlung sources is initially that as described hereinabove for the production of beta sources. The principal difference is that, as will be appreciated by those skilled in the art, the shielding requirements for gamma-emitting radiating sources are much more severe than those for beta-emitting sources. Whenever possible or as required, the manufacturing operations are performed remotely behind lead shielding.

In order to achieve even greater shielding and strength about the particulate radioactive ceramic materials, one can optionally (in the case where the radioactive material is enclosed within a tube), simply insert a first barrier layer in the form of a tube into a second tube type barrier layer. The second tube has an inside diameter preferably slightly larger than the outside diameter of the first tube. Of course, the respective wall thicknesses of the two tubes should each be such that together there does not occur an excessive amount of absorption of useful radioactive energy by the two tube barrier walls.

As those skilled in the art will appreciate, while sources made in accordance with this invention will usually be generally of the type referred to in the trade as line sources, due to the geometric configurations of the radioactive particles within the source base, it is equally possible to produce planar sources either by having a series of tube type barrier layers in parallel relationship to one another upon a source base surface, or by having a uniform layer of individual ceramic radioactive particles dispersed across a given surface area, the resulting area then being coated with a continuous ceramic overcoating.

In this latter situation, the individual, discrete particles are each separately coated with a barrier layer. Here, too, this layer is usually metallic.

One convenient method of individually coating discrete vitreous particles is to deposit a thin layer of metal upon the individual particle surfaces. Such a coated particle is shown in cross section in FIGURE 18, in which substantially spherical ceramic particle 70 is provided with a continuous coating of metal 71. The thickness of the metal coating and the diameter of the particle are not drawn to scale.

For example, one can apply a nickel coating to radioactive particles, such as radiating microspheres. Such a nickel coating can be applied by electroless coating methods such as those described by Brenner et al. in Metal Finishing, vol. 52, pp. 61–76 (November and December 1954). See also U.S. Patents Nos. 2,690,402, 2,532,283, 2,532,284 2,454,610, and the following articles: bulletin entitled Electroless Plating, published by the U.S. Department of Commerce, National Bureau of Standards, March 1, 1958; Plating, December 1957, Dr. Clara H. de Minjer and Dr. Abner Brenner; U.S. Department of Commerce, National Bureau of Standards, Research Paper RP1835, vol 39, November 1957—Abner Brenner and Grace Riddell; U.S. Department of Commerce, National Bureau of Standards, October 1947; Metal Finishing, September 1947, 64, Harold Narcus, Electrochemical Industries; and Harold Narcus, The Electrochemical Society, Inc.

The nickel base coating can be further plated with a noble metal such as gold to give an additional barrier layer. Such coated beads form a very useful method for making planar radioactive sources because the coated vitreous radioactive particles can be fixed to metal plates and then coated over with a ceramic overcoating. In fact, a preferred method of construction is to slurry the metal coated radioactive ceramic particles in the frit slip and deposit the resulting suspension over the desired area of the base. This is then fired to fix the metal coated beads in the bonding frit to the base surface. Gold can also be used, up to about .001 inch maximum thickness.

This technique is particularly useful in fabricating alpha radiation sources. As is well known, the thickness of any overcoat on an alpha source must be held to a minimum consistent with providing the desired radiochemical integrity yet allowing a usable amount of alpha radiation to escape.

Electrolessly plated ceramic particles wherein the metallic overcoating serves as the barrier layer are usually used to make so-called planar sources in which the radioactivity comes from a region upon the surface of any solid base material rather than from a line or a point upon such base. However, it will be appreciated by those skilled in the art that point and line sources can also be readily prepared using these electrolessly coated particles.

In general, to prepare a source using electrolessly coated ceramic particles, techniques similar to those used for tube type source are employed. The construction is well illustrated by describing the method of making an alpha particle emitting source. First, one deposits upon a metallic or ceramic base material within a prechosen area radioactive ceramic particles containing an alpha-emitting isotope, such particles being coated with a metallic barrier coating by the electroless coating techniques indicated above. The base material can be recessed in the region where the beads are placed if desired, but this is not necessary. Thereafter, one deposits over the surface of the beads, as by spraying, painting, or the like, a binder coating composition as a barrier layer. This binder coating composition can either be of the nature of a ceramic porcelain enamel, which is subsequently fired, or it can be of the nature of an organic ploymer, such as epoxy resins, or the like.

Usually, however, the overcoating will be an inorganic ceramic barrier layer, the particular composition of the ceramic frit in any given situation being one which is suitable for bonding both to the metallic barrier coating upon the beads and to the base material. Examples of such frits include stainless steel frits, aluminum frits, etc., the exact choice of a frit of course at any given instance is determined by the base material. It will be appreciated that the electroless plated ceramic particles can be mixed with the binder before application to the base material. This slurry is then deposited by conventional techniques such as knife-coating, etc.

The invention is further illustrated by reference to the following examples.

EXAMPLE 1

To prepare a high temperature-resistant integral beta radiation source, one takes a stainless steel tube type 304L stainless steel, 1¼" long with an outside diameter of 0.028" and an inside diameter of 0.020". The tube is cleaned interiorly by a solvent wash and then one end is heliarc welded shut to produce a hermetic seal.

Microspheres prepared in accordance with the teachings of Ryan in U.S. patent application, Ser. No. 712,254, filed January 30, 1958, containing on the average 3000 millicuries of Strontium-90 per gram of gross weight, are introduced into this tube using the shielded scoop and funnel arrangement shown in FIG. 2 and described above. The tube is loaded with 10 milligrams of beads. Tube loading is facilitated by placing the tube in a holder mounted on a standard vibrator unit. After loading the tube end is crimped shut to prevent any of the microspheres from falling out during subsequent handling. Finally, the tube is scrubbed with a detergent in water to remove any extraneous radioactive material which may have been deposited during the filling operation upon the tube exterior. Next, the scrubbed tube is wipe-tested to make sure that there is no extraneous radioactive material left on its exterior surface following the scrubbing operation. The radiation level of the tube is checked with a suitable counting device to make sure that the filling constitutes the correct total amount of radioactive material desired in the inside of the tube.

The next step is to place the filled stainless steel tube into a stainless steel base. Here a 1" x 2" rectangular block of stainless steel ⅛" thick is used. The appropriate groove of width and depth equivalent to the diameter of the tube end mounting holes are machined into the base. Next, the tube is positioned in the groove by means of the tube positioning tool as shown in FIG. 7 and the crimped end of the tube is hermetically sealed by silver brazing after being positioned into the groove of the base. The excess silver brazing flux is scrubbed off using warm water. The source is then leak-tested by immersing it in hot oil at 150° C. for 15 seconds to check for any holes in the tube walls or ends. Next, end plugs are pressed over the tube into the end plug holes of the base, the end plug holes of the base having been machined into the base at the end regions of the grooves of the tube. Thereafter, these end plugs are ground flush with the top of the source base face. A hot water and detergent scrubbing step is next in order to remove any remaining exterior extraneous radioactive material.

Now the base containing the tube is annealed at 1600° F. for five minutes to remove any stresses possibly induced by the end plug insertion and pressing operation. After annealing, the source is sandblasted to prepare the surface of the base bearing the tube for application of porcelain enamel. A suitable typical stainless steel frit composition suitable for use in this invention is described for example by Moore and Ubanks in vol. 39, Journal of the American Ceramic Society, page 358. A typical aluminum frit composition suitable for use in this invention is described for example in British Patent No. 847,225. Frst, however, the face of the source base is wipe-tested to determine whether any extraneous radioactive material is present. Next, the porcelain enamel slip is sprayed on the face of the source and allowed to air-dry. The enamel is then fired for 10 minutes at 1530° F. in air and thereafter allowed to cool. The cooled enamel is then inspected for any flaws such as skips, chipping, or the like. The source is leak-tested by immersion in oil at 150° C. for 15 seconds. Next, the edges of the source are sandblasted to remove oxide materials formed during the enamel firing to improve the aesthetic appearance of the source. Next, the radiation level of the source is checked by a radiation measuring instrument, here an ionization chamber, to make sure that the source meets the specifications. Thereafter the source is wipe-tested again to make sure that it has no radioactive contamination on its surface. Last of all, a nameplate is added, the source is rewipe-tested and is then ready for use.

Further examples are presented in Table I below as a matter of convenience and brevity. In Examples 2 through 8 the same procedure of preparation is used as described above for Example 1.

To prepare a beta radiation source with a high beta to bremsstrahlung output, one proceeds as in Example 1 except the base and tube material is selected from one of the lower atomic number materials, i.e., aluminum, graphite, etc. Examples 9 through 12 of Table I illustrate this type of source.

The preparation of gamma sources also follows the same procedure, except that a radiating source containing a gamma-emitter such as Cobalt-60 is used, for example, microspheres containing 5000 millicuries of Cobalt-60 per gram. Examples 13 through 20 are such sources.

Bremsstrahlung sources employ such isotopes as Strontium-90 or Promethium-147, together with a heavy metal such as gold. Examples 21 through 25 are such sources.

*Table I (Part 1)*

| Example Number (Beta source) | Base | | | Tube | | | | | |
|---|---|---|---|---|---|---|---|---|---|
| | Composition | Description | | Composition | End sealing method | End fastening | Size, in. | | |
| | | Shape | Size, in. | | | | Length | O.D. | I.D. |
| 1 | Stainless steel | Rectangular | 1 x 2 x ⅛ | Stainless steel | Weld or silver braze. | End plugs | 1¼ | 0.028 | 0.020 |
| 2 | Monel | do | 1 x 2 x ⅛ | Monel | do | do | 1¼ | 0.028 | 0.020 |
| 3 | Stainless steel | Circular | 1½ dia. x ⅛ thick. | Stainless steel | do | do | 1¼ | 0.028 | 0.020 |
| 4 | do | Rectangular | 1 x 2 x ⅛ | do | do | do | 2 tubes ea. 1¼. | 0.028 | 0.020 |
| 5 | do | do | 1 x 2 x ⅛ | do | do | do | 2½ | 0.028 | 0.020 |
| 6 | do | do | 1 x 2 x ⅛ | do | do | do | 1¼ | 0.022 | 0.020 |
| 7 | do | do | 1 x 2 x ⅛ | do | do | do | 1¼ | 0.025 | 0.020 |
| 8 | do | do | 1 x 2 x ⅛ | do | do | do | 1¼ | 0.016 | 0.028 |
| 9 | Graphite | do | 1 x 2 x ⅛ | Graphite | Adhesive | Adhesive or end plugs. | 1¼ | 0.050 | 0.020 |
| 10 | Aluminum | do | 1 x 2 x ⅛ | Aluminum | Crimp or weld | Staking | 1¼ | 0.028 | 0.020 |
| 11 | Aluminum oxide | do | 1 x 2 x ⅛ | Aluminum oxide. | Adhesive | End plugs | 1¼ | 0.050 | 0.030 |
| 12 | Magnesium | do | 1 x 2 x ⅛ | Magnesium | Adhesive or solder. | do | 1¼ | 0.050 | 0.030 |

Table I (Part 1)—Continued

| Example Number (Beta source) | Porcelain enamel overcoat | | | | Radiation loading | | Product source characteristics | |
|---|---|---|---|---|---|---|---|---|
| | Base surface preparation | Firing | | Fired thickness, in. | Isotope | Specific activity, mc./gm. | Order of magnitude of radiation dosage in milliroetgens/hour | Ratio of beta to brem output (greater than) |
| | | Temperature, °F. | Time, min. | | | | | |
| 1 | Sandblast | 1,530 | 10 | 0.005 | Sr-Y 90 | 3,000 | 2,500 at 22″ | 10 |
| 2 | do | 1,530 | 10 | 0.005 | Sr-Y 90 | 3,000 | 2,500 at 22″ | 10 |
| 3 | do | 1,530 | 10 | 0.005 | Sr-Y 90 | 3,000 | 2,500 at 22″ | 10 |
| 4 | do | 1,530 | 10 | 0.005 | Sr-Y 90 | 3,000 | 5,000 at 22″ | 10 |
| 5 | do | 1,530 | 10 | 0.005 | Sr-Y 90 | 3,000 | 4,000 at 22″ | 10 |
| 6 | do | 1,530 | 10 | 0.001 | Pm-147 | 20,000 | 10,000 at 22″ | 10 |
| 7 | do | 1,530 | 10 | 0.002 | Tl-204 | 1,000 | 700 at 22″ | 10 |
| 8 | do | 1,530 | 10 | 0.005 | Sr-Y 90 | 3,000 | 2,500 at 22″ | 10 |
| 9 | do | 1,530 | 10 | 0.005 | Sr-Y 90 | 3,000 | 2,500 at 22″ | 50 |
| 10 | Prefire 1000° F. 5 minutes. | 1,000 | 5 | 0.005 | Sr-Y 90 | 3,000 | 4,500 at 22″ | 50 |
| 11 | Sandblast | 1,530 | 10 | 0.005 | Sr-Y 90 | 3,000 | 3,000 at 22″ | 50 |
| 12 | do | 1,000 | 5 | 0.005 | Sr-Y 90 | 3,000 | 4,500 at 28″ | 50 |

Table I (Part 2)

| Example Number (Gamma source) | Base | | | Tube | | | | | |
|---|---|---|---|---|---|---|---|---|---|
| | Composition | Description | | Composition | End sealing method | End fastening | Length, in. | O.D., in. | I.D., in. |
| | | Shape | Size, in. | | | | | | |
| 13 | Stainless steel | Rectangular | 1 x 2 x ⅛ | Stainless steel | Weld or silver braze. | End plugs | 1¼ | 0.028 | 0.020 |
| 14 | do | do | 1 x 2 x ⅛ | do | do | do | 1¼ | 0.028 | 0.020 |
| 15 | do | do | 1 x 2 x ⅛ | do | do | do | 1¼ | 0.028 | 0.020 |
| 16 | do | do | 1 x 2 x ⅛ | do | do | do | 1¼ | 0.100 | 0.050 |
| 17 | do | do | 2 x 3 x ⅛ | do | do | do | 2 | 0.028 | 0.020 |
| 18 | Monel | do | 1 x 2 x ⅛ | Monel | do | do | 1¼ | 0.028 | 0.020 |
| 19 | Stainless steel | Circular | 2 dia | Stainless steel | do | do | 1¼ | 0.028 | 0.020 |
| 20 | do | Rectangular | 1 x 2 x ⅛ | do | do | do | 1¼ | 0.100 | 0.080 |
| 21 | Aluminum oxide | do | 1 x 2 x ⅛ | do | Inorganic cement. | do | 1¼ | 0.028 | 0.020 |

| Example Number (Gamma Source) | Porcelain enamel overcoat | | | | Radiation loading | |
|---|---|---|---|---|---|---|
| | Base surface preparation | Firing | | Fired thickness | Isotope | Specific activity, mc./gm. |
| | | Temperature | Time | | | |
| 13 | Sandblast | 1530° F | 10 minutes | 0.005″ | Cobalt-60 | 5,000 |
| 14 | do | 1530° F | do | 0.005″ | Radium-226 | 300 |
| 15 | do | 1530° F | do | 0.005″ | Cesium-137 | 4,000 |
| 16 | do | 1530° F | do | 0.005″ | do | 4,000 |
| 17 | do | 1530° F | do | 0.005″ | do | 4,000 |
| 18 | do | 1530° F | do | 0.005″ | Cobalt-60 | 5,000 |
| 19 | do | 1530° F | do | 0.005″ | do | 5,000 |
| 20 | do | 1530° F | do | 0.005″ | Cesium-137 | 4,000 |
| 21 | Special glaze coating | | | | Cobalt-60 | 5,000 |

Table I (Part 3)

| Example Number (Brem source) | Base | | | Tube | | | | | |
|---|---|---|---|---|---|---|---|---|---|
| | Composition | Description | | Composition | End sealing method | End fastening | Length, in. | O.D., in. | I.D., in. |
| | | Shape | Size, in. | | | | | | |
| 22 | Stainless steel | Rectangular | 2 x 3 x ⅛ | Stainless steel | Weld or silver braze. | End plugs | 1¼ | 0.092 | 0.030 |
| 23 | do | do | 2 x 3 x ⅛ | Gold | do | do | 1¼ | 0.048 | 0.040 |
| 24 | do | do | 2 x 3 x ⅛ | Platinum | Weld | do | 1¼ | 0.092 | 0.030 |
| 25 | do | do | 2 x 3 x ⅛ | Stainless steel | Weld or silver braze. | do | 1¼ | 0.092 | 0.030 |

| Example Number (Brem Source) | Porcelain enamel overcoat | | | | Radiation loading | | Heavy metal |
|---|---|---|---|---|---|---|---|
| | Base surface preparation | Firing | | Fired thickness | Isotope | Specific Activity, mc./gm. | |
| | | Temperature | Time | | | | |
| 22 | Nitric acid etch | 1530° F | 10 minutes | 0.005″ | Sr-90 | 3,000 | Gold. |
| 23 | do | 1530° F | do | 0.005″ | Pm-147 | 20,000 | Gold. |
| 24 | do | 1530° F | do | 0.005″ | Sr-90 | 3,000 | Lead. |
| 25 | Sandblast | 1530° F | do | 0.005″ | Sr-90 | 3,000 | Platinum. |

EXAMPLE 26

The preparation of radiating sources using barrier layers on individual particles is illustrated by the preparation of alpha radiation sources. Electroless plated ceramic particles containing an alpha-emitting isotope are prepared as follows. The coating may be nickel, gold or other suitable barrier material. A nickel plating bath is prepared after the manner described by Brenner in Metal Finishing, vol. 52, pp. 61–76 (December and November 1954). This bath has the following composition:

| Component: | Weight per liter of aqueous solution, grams |
|---|---|
| $NiCl_2 \cdot 6H_2O$ | 30 |
| $NH_4Cl$ | 50 |
| Sodium citrate | 100 |
| $Na_2H_2PO_2 \cdot H_2O$ | 10 |

The pH of this solution nickel plating bath is adjusted to about 10 with concentrated $NH_4OH$. Sr-90 radioactive microspheres of the type used in the preceding examples are primed by first soaking them in 10 aqueous percent $SnCl_2 \cdot PdCl_2$. The beads are added to a hot plating bath maintained at about 200° F. in the ratio of 1 gram of radioactive microspheres per 2 liters of bath. The reaction mixture is stirred vigorously for 1 hour at the end of which point the radioactive microspheres are washed and dried.

When these product beads are mixed with commercial porcelain enamel for stainless steel and fired at 1500° F. for 5 minutes, only about 0.2 percent of the radioactivity is removed by a soak test in 0.01 N HCl at 50° C. for 3 days. When a gold overcoating is applied only 0.1 percent of the radioactivity is removed when tested as described.

When uncoated beads are tested as described, 2.1 percent of the radioactivity is leached out.

The electrolessly coated radioactive alpha-emitting ceramic particles are deposited upon a base material within a prechosen area. The base material is recessed to a depth of 0.010 inch in the area where the radioactive ceramic particles are deposited.

Thereafter a ceramic frit binder coating is deposited over the surface of the beads and is subsequently fired to produce a glassy overcoating layer.

The following Table II presents in summary form additional details for Examples 26, 27 and 28 relating to the manufacture of alpha sources in accordance with the teachings of this invention.

What is claimed is:

1. A radiation source comprising, in combination, a solid radioisotope forming part of a ceramic carrier, and a corrosion-resistant external ceramic shield therefor which is substantially permeable to the radiation of said isotope, the said radioisotope being separated from the said shield by an occluding barrier layer which is substantially permeable to the radiation from the said radioisotope and which is impermeable to the said radioisotope and radioactive decay products, the said barrier layer being substantially non-reactive with the said external shield and the said radioiosotope at temperatures of the order of those at which the shield is applied, said shield and barrier being bonded together so as to form an integral construction.

2. A radiation source comprising a base element, a mass of discrete radioactive ceramic particles having an average size of less than about 500 microns, a continuous layer of nonradioactive ceramic material covering at least a portion of the surface of said base element and occluding the particulate mass of radioatcive material, a continuous, imperforate metallic barrier layer between said particulate radioactive mass of ceramic material and said continuous layer of non-radioactive ceramic material, said continuous layer of ceramic material and said barrier layer being bonded together, and having a total thickness less than that which will pass a usable amount of the radiation from said radioactive mass of ceramic material.

3. A beta radiation source comprising ceramic particles containing a beta-emitting radioatcive isotope, said particles having average diameters less than about 200 microns, a barrier in the form of an imperforate metallic tube hermetically sealed at both ends and filled with said ceramic particles, a base element supporting said barrier element, and a ceramic non-radioactive layer bonded to said barrier and covering at least a portion of the said base element and occluding the metallic tube held upon said base element.

4. A gamma radiation source comprising ceramic particles containing a gamma-emitting radioactive isotope, said particles having average diameters less than about 500 microns, a barrier in the form of an imperforate metallic tube hermetically sealed at both ends and filled with said ceramic particles, a base element supporting said barrier element, and a ceramic nonradioactive layer bonded to said barrier and covering at least a portion of the said base element and occluding the metallic tube held upon said base element.

*Table II*

| Example Number (Alpha Source) | Base | | | Barrier layer | | Carrier particle | |
|---|---|---|---|---|---|---|---|
| | Composition | Shape | Size, in. | Composition | Thickness, in. | Isotope | Specific activity, mc./gm. |
| 26 | Stainless steel | Rectangular | 1 x 2 x ⅛ | Nickel coating on each particle. | 0.0002 | Po-210 | 1,000 |
| 27 | Aluminum | do | 1 x 2 x ⅛ | Gold coating on each particle. | 0.00001 | Pu-239 | 500 |
| 28 | do | do | 1 x 2 x ⅛ | Nickel coating on each particle. | 0.00001 | Po-210 | 1,000 |

*Table II—Continued*

| Example Number (Alpha source) | Base surface preparation | Overcoat | | |
|---|---|---|---|---|
| | | Temperature, °F. | Time, min. | Fired thickness, in. |
| 26 | Stainless steel porcelain enamel. | 1,530 | 10 | [1] 0.002 |
| 27 | Aluminum procelain enamel. | 1,000 | 5 | [1] 0.002 |
| 28 | do | 1,000 | 5 | [1] 0.002 |

[1] Average.

5. A bremsstrahlung radiation source comprising ceramic particles containing a beta-emitting radioactive isotope, said particles having average diameters less than about 200 microns, a barrier in the form of an imperforate metallic tube hermetically sealed at both ends and filled with said ceramic particles, the tube thickness being such that substantially all the beta radiation is absorbed therein, said tube preferably being of high atomic number, a base element supporting said barrier element, and a ceramic non-radioactive layer bonded to said barrier and covering at least a portion of the said base element and occluding the metallic tube held upon said base element.

6. A bremsstrahlung radiation source comprising ceramic particles containing a beta-emitting radioactive isotope, said particles having average diameters less than about 200 microns, a barrier in the form of an imperforate metallic tube hermetically sealed at both ends and filled with said ceramic particles and a high atomic number material, a base element supporting said barrier element, and a ceramic non-radioactive layer bonded to said barrier and covering at least a portion of the said base element and occluding the metallic tube held said base element.

7. An alpha source comprising a base element, a mass of discrete radioactive ceramic particles having an average size of less than about 200 microns, a continuous layer of non-radioactive material covering at least a portion of the surface of said base element and occluding the particulate mass of radioactive material, a continuous imperforate metallic barrier layer surrounding each particle of radioactive vitreous material, said continuous layer of vitreous material and said barrier layer being bonded together, and having a total thickness less than that which will pass usable amounts of the radiation from said radioactive mass of ceramic material.

8. A gamma source comprising a base element, a mass of discrete radioactive ceramic particles having an average size of less than about 500 microns, a continuous layer of non-radioactive vitreous material covering at least a portion of the surface of said base element and occluding the particulate mass of radioactive material, a continuous imperforate metallic barrier layer surrounding each particle of radioactive ceramic material, said continuous layer of ceramic material and said barrier layer being bonded together, and having a total thickness less than that which will pass usable amounts of the radiation from said radioactive mass of ceramic material.

9. A bremsstrahlung source comprising a base element, a mass of discrete radioactive ceramic particles having an average size of less than about 500 microns, a continuous layer of non-radioactive ceramic material covering at least a portion of the surface of said base element and occluding the particulate mass of radioactive material, a continuous imperforate metallic barrier layer surrounding each particle of radioactive ceramic material, said continuous layer of ceramic material and said barrier layer being bonded together, and having a total thickness less than that which will pass usable amounts of the radiation from said radioactive mass of ceramic material.

10. A beta source comprising a base element, a mass of discrete radioactive ceramic particles having an average size of less than about 500 microns, a continuous layer of non-radioactive ceramic material covering at least a portion of the surface of said base element and occluding the particulate mass of radioactive material, a continuous imperforate metallic barrier layer surrounding each particle of radioactive ceramic material, said continuous layer of ceramic material and said barrier layer being bonded together, and having a total thickness less than that which will pass usable amounts of the radiation from said radioactive mass of ceramic material.

References Cited by the Examiner
UNITED STATES PATENTS

| | | | |
|---|---|---|---|
| 2,128,408 | 8/38 | Grenier | 250—106 X |
| 2,405,026 | 7/46 | Feuer et al. | 250—106 |
| 2,476,644 | 7/49 | Wallhausen et al. | 250—106 |
| 2,592,115 | 4/52 | Carroll | 250—106 |
| 2,797,333 | 6/57 | Reiffel | 250—106 X |

RALPH G. NILSON, *Primary Examiner.*

ARCHIE R. BORCHELT, FREDERICK M. STRADER, *Examiners.*